Patented Aug. 3, 1943

2,325,735

UNITED STATES PATENT OFFICE 2,325,735

VULCANIZATION OF RUBBER

Edward S. Blake, Nitro, W. Va., assignor to Monsanto Chemical Company, St. Louis, Mo., a corporation of Delaware No Drawing. Application April 5, 1940,
Serial No. 328,085

20 Claims. (Cl. 260—775)

This invention relates to the vulcanization of rubber or similar plastic. More particularly the present invention relates to an improved process of vulcanizing rubber and to the vulcanized rubber products obtained thereby.

It is an object of this invention to vulcanize rubber by the aid of a new class of organic accelerators or vulcanizing agents. Another object is to provide a class of organic sulfides which are direct vulcanizing agents. Another object is to provide an improved process of vulcanizing rubber and more particularly to provide a process in which prevulcanization is substantially eliminated. A further object is to extend the usefulness of accelerators active at low temperature and to provide new combinations of accelerators. Still further objects are to provide rubber products of improved physical properties and to advance the art.

The vulcanizing agents or accelerators of this invention comprise morpholine sulfides and more particularly products possessing the probable structural formula

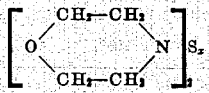

where $x$ is an integer. These products, as set forth in my co-pending application Serial No. 319,480 filed February 17, 1940, may be prepared by treating morpholine with a sulfur halide and where higher sulfides are desired by reacting the compound so prepared with sulfur. In place of morpholine itself substituted morpholines may be employed so long as the heterocyclic nitrogen atom remains unsubstituted. For example the sulfides of methyl and ethyl substituted morpholine are within the scope of this invention. Preparation of the new vulcanizing agents however, constitutes no part of the present invention and the invention is not limited thereto but relates to the use of morpholine sulfides in the process of vulcanizing rubber whatever the method of their preparation.

The new and preferred class of materials finds numerous applications in the curing and compounding of rubber. For example they may be used in place of the usual vulcanizing agents. It is preferred however to employ them in conjunction with small amounts of sulfur, i. e. amounts of sulfur much less than would be necessary for proper vulcanization with sulfur alone. Numerous advantages attend the replacement of all or part of the sulfur normally employed in a rubber stock by a morpholine sulfide. For example the danger of prevulcanizing the rubber stock or "scorching" during processing operations prior to actual vulcanization is substantially eliminated. In this connection many otherwise desirable accelerators are limited or excluded in commercial practice because of scorching difficulties. As is shown below many of these low temperature accelerators may be safely handled in accordance with the principles of this invention. Furthermore the morpholine sulfides provide vulcanized rubber products of superior aging characteristics. Other advantages will in part be apparent and in part pointed out in the specific examples following.

The choice and amount of the particular morpholine sulfide to be used varies widely and of course depends upon the particular rubber composition with which it is to be used, the compounding improvement sought, the physical properties desired in the vulcanizate and the like. Where used as direct vulcanizing agents a morpholine sulfide containing at least two atoms of sulfur per molecule is preferred, in other words a morpholine disulfide or polysulfide. The preferred materials surprisingly have available at vulcanization temperatures all of the sulfur contained in the molecule as judged by their curing properties in comparison with sulfur in amounts equal to their sulfur content. Thus the optimum amount of a morpholine sulfide to be employed in a given case may be approximately calculated from its sulfur content. However there is generally little or no benefit to be derived from employing a morpholine sulfide in an amount greater than that required to furnish about 1.0 part of sulfur based on the rubber although larger amounts may be employed if desired. By way of example, morpholine disulfide contains 27.11% sulfur so that 3.7 parts by weight based on the rubber correspond to 1.0 part of sulfur. Again high amounts may be used if desired. Thus 7.4 parts by weight have been used to advantage. However, for most purposes and especially in conjunction with 0.05 or more parts of sulfur considerably smaller amounts are sufficient.

The desirable curing properties of the preferred materials may be illustrated by compounding a rubber stock comprising one of the morpholine sulfides and vulcanizing the stock in the usual manner. In order to show the lack of "scorch" plasticity data on an uncured rubber stock containing as the vulcanizing agent a morpholine sulfide may be compared with that on a similar stock in which the said vulcanizing agent has been replaced by sulfur. A convenient means of obtaining plasticity data is by the use of a Williams Plastometer described by Williams, Industrial and Engineering Chemistry vol. 16, p. 362 (1924)—see also Krall ibid vol. 16, p. 922 (1924). A brief description of the method employed in determining the plasticity figures set forth below follows. Cylinders of two cubic centimeters in volume are cut from uncured rubber compounded stocks and placed in a constant temperature oven for the times and at the temperature indicated. After this initial heating, called "preheating," the test pieces of the uncured stock are placed in the Williams plastometer, which in reality is a plastometer press, having a movable upper weighted plate connected to a gauge graduated in $1/100$ millimeter so as to measure the distance between the upper and lower plates of the press. The plastometer is maintained in a constant temperature oven maintained at 70° C. During the plasticity test the preheated test piece remains in the plastometer with the upper movable plate resting on it for exactly three minutes, at the end of which period the reading on the gauge is taken, which reading is called the plasticity figure. This plasticity figure is in reality the height of the rubber test cylinders in $1/100$ millimeters after the upper movable plate of the press has rested on it for the period of three minutes designated. The lower figures indicate a less curing of the stock or a less "scorchy" stock.

As specific embodiments of the invention but in nowise limitative of the same, rubber stocks were compounded comprising

| | A | B | C |
|---|---|---|---|
| | Parts by weight | Parts by weight | Parts by weight |
| Smoked sheets of rubber | 100 | 100 | 100 |
| Whiting | 148.8 | 148.8 | 148.8 |
| Zinc oxide | 64.5 | 64.5 | 64.5 |
| Ozokerite | 2.5 | 2.5 | 2.5 |
| Stearic acid | 0.6 | 0.6 | 0.6 |
| P33 Black | 0.8 | 0.8 | 0.8 |
| Phenyl B naphthylamine | 2.4 | 2.4 | 2.4 |
| Piperidine cyclopentamethylene dithiocarbamate | 2.0 | 2.0 | 2.0 |
| Sulfur | 0.6 | | |
| Morpholine disulfide | | 0.925 | 2.22 |

The stocks so compounded were vulcanized by heating for different periods of time at the temperature of 25 pounds steam pressure per square inch (266° F.). The modulus and tensile properties of the cured rubber products are given below.

Table I

| Stock | Cure | Modulus of elasticity in lbs./in.$^2$ at elongations of— | | Tensile at break in lbs./in.$^2$ | Ult. elong. |
|---|---|---|---|---|---|
| | | 200% | 400% | | |
| | Mins. | Percent | Percent | | Percent |
| A | 30 | 490 | 1,255 | 1,660 | 485 |
| B | 30 | 485 | 1,200 | 1,550 | 490 |
| C | 30 | 505 | 1,320 | 1,750 | 485 |
| A | 60 | 465 | 1,220 | 1,550 | 470 |
| B | 60 | 480 | 1,320 | 1,625 | 490 |
| C | 60 | 535 | 1,360 | 1,740 | 475 |

These modulus and tensile figures show the desirable cures obtained by use of the preferred class of materials. The 2.22 parts of morpholine disulfide in the C stock contains only 0.6 part sulfur yet produces a higher modulus product than the A stock. A much smaller amount as employed in the B stock is sufficient to substantially equal the physical properties of the A stock.

Plasticity data

| Preheating | | Stock | Plasticity figure |
|---|---|---|---|
| Time in mins. | Temp., °F. | | |
| 30 | 200 | A | 917 |
| 180 | 200 | C | 442 |
| 240 | 200 | C | 488 |
| 240 | 200 | B | 556 |

The plasticity data show that scorching may be materially reduced by the use of the preferred class of materials.

The stocks described above were also aged in an air bomb for 8 hours at 260° F. and under 80 pounds air pressure per square inch. The physical properties of the aged rubber products are given below.

Table II

| Stock | Cure time in mins. | Modulus of elasticity in lbs./in.$^2$ at elongations of— | | Tensile at break in lbs./in.$^2$ | Ult. elong. |
|---|---|---|---|---|---|
| | | 200% | 400% | | |
| | | | | | Per cent |
| A | 30 | 485 | | 1,000 | 370 |
| B | 30 | 545 | 1,235 | 1,235 | 400 |
| C | 30 | 590 | 1,200 | 1,200 | 400 |
| A | 60 | 480 | | 1,045 | 395 |
| B | 60 | 500 | 1,210 | 1,210 | 400 |
| C | 60 | 565 | 1,185 | 1,185 | 400 |

The above data show that rubber stocks vulcanized with the aid of the preferred class of materials possess desirable aging properties and in particular that morpholine sulfides provide vulcanizates possessing aging properties superior to those obtained from stocks vulcanized with sulfur.

As further specific embodiments of the invention rubber stocks were compounded comprising

|  | Stock | | | |
| --- | --- | --- | --- | --- |
|  | D | E | F | G |
|  | Parts by weight | Parts by weight | Parts by weight | Parts by weight |
| Smoked sheets of rubber | 100 | 100 | 100 | 100 |
| Whiting | 60 | 60 | 60 | 60 |
| Zinc oxide | 10 | 10 | 10 | 10 |
| Mineral acid treated 2,2,4 trimethyl dihydroquinoline | 2 | 2 | 2 | 2 |
| Piperidine cyclopentamethylene dithiocarbamate | 2 | 2 | 2 | 2 |
| Stearic acid | 1 | 1 | 1 | 1 |
| Sulfur | 0.6 | 1 |  |  |
| Morpholine monosulfide |  |  | 3.8 | 6.3 |

The plasticity data on the stocks so compounded are given below:

*Plasticity data*

| Preheating | | Stock | Plasticity figure |
| --- | --- | --- | --- |
| Time in mins. | Temp., °F. | | |
| 30 | 200 | D | 885 |
| 30 | 200 | E | 903 |
| 780 | 200 | F | 210 |
| 780 | 200 | G | 210 |
| 840 | 200 | F | 212 |
| 840 | 200 | G | 212 |

The plasticity figures show that pre-vulcanization of stocks containing accelerators active at low temperatures may be avoided by use of the preferred class of materials as vulcanizing agents.

The modulus and tensile properties of the cured rubber products containing prior to vulcanization, morpholine monosulfide are set forth below. The stocks were vulcanized in the usual manner by heating in a press at the temperature of 40 pounds steam pressure per square inch.

*Table III*

| Stock | Cure time in mins. | Modulus of elasticity in lbs./in.$^2$ at elongations of— | | Tensile at break in lbs./in.$^2$ | Ult. elong. |
| --- | --- | --- | --- | --- | --- |
|  |  | 300% | 500% |  |  |
|  |  |  |  |  | Per cent |
| F | 90 | 475 | 1,480 | 2,665 |  |
| G | 90 | 415 | 1,330 | 2,520 | 605 |

The above data show the desirable physical properties obtained by use of the preferred class of materials as vulcanizing agents.

As further embodiments of the invention rubber stocks were compounded comprising the usual manner by heating for different periods of time in a press at the temperature of 50 pounds per square inch (300° F.). The modulus and tensile properties of the cured rubber products are given below:

*Table IV*

| Stock | Cure time in mins. | Modulus of elasticity in lbs./in.$^2$ at elongations of— | | Tensile at break in lbs./in.$^2$ | Ult. elong. |
| --- | --- | --- | --- | --- | --- |
|  |  | 300% | 500% |  |  |
| H | 12 | 390 | 1,200 | 3,210 | 700 |
| J | 12 | 465 | 1,525 | 3,650 | 665 |

*Plasticity data*

| Preheating | | Stock | Plasticity figure |
| --- | --- | --- | --- |
| Time in mins. | Temp., °F. | | |
| 240 | 200 | H | 525 |
| 300 | 200 | H | 672 |
| 540 | 200 | J | 467 |
| 600 | 200 | J | 592 |

The plasticity data show the marked retardation of scorch obtained by use of a morpholine polysulfide as the vulcanizing agent.

The preferred class of materials are most advantageously employed in conjunction with small amounts of sulfur. For example a stock similar to the H stock above containing 1.25 parts by weight of sulfur shows considerable set-up or pre-vulcanization after 180 minutes heating at 200° F. Reducing the sulfur to 0.05 part by weight and adding 1.0 part by weight of morpholine disulfide gave a stock which showed a good cure in 9 minutes when heated in a press at the temperature of 62 pounds steam pressure per square inch (309° F.) and at the same time the plasticity figure of this stock after 660 minutes preheating at 200° F. was lower than that of the stock containing 1.25 parts of sulfur after 180 minutess preheating. Increasing the sulfur to 0.25 part in conjunction with 1.0 part of morpholine disulfide gave a stock which cured in 6 minutes at the same temperature without greatly increasing the "scorch." The plasticity figure for the unvulcanized stock after 11 hours preheating at 200° F. was likewise lower than that of the sulfur stock mentioned above after 180 minutes preheating.

As further illustrative of the desirable results attending the preferred use of the morpholine sulfides rubber stocks were compounded comprising

|  | Stock | |
| --- | --- | --- |
|  | H | J |
|  | Parts by weight | Parts by weight |
| Smoked sheets of rubber | 100 | 100 |
| Whiting | 40 | 40 |
| Zinc oxide | 5 | 5 |
| Stearic acid | 1 | 1 |
| Mineral acid treated 2,2,4 trimethyl dihydroquinoline | 2 | 2 |
| Di(benzothiazyl thiol) dimethyl urea | 1.05 | 1.05 |
| Diphenyl guanidine phthalate | 0.45 | 0.45 |
| Paraffin | 0.75 | 0.75 |
| Sulfur | 1.00 |  |
| Morpholine tetrasulfide |  | 2.35 |

The stocks so compounded were vulcanized in

|  | Stock | | |
| --- | --- | --- | --- |
|  | K | L | M |
|  | Parts by weight | Parts by weight | Parts by weight |
| Smoked sheets of rubber | 100 | 100 | 100 |
| P33 Carbon Black | 40 | 40 | 40 |
| Zinc oxide | 5 | 5 | 5 |
| Stearic acid | 1 | 1 | 1 |
| Paraffin | 0.75 | 0.75 | 0.75 |
| Acetone-p-amino diphenyl condensation product | 2 | 2 | 2 |
| Di(benzothiazyl thiol) dimethyl urea | 1.05 | 1.05 | 1.05 |
| Diphenyl guanidine phthalate | 0.45 | 0.45 | 0.45 |
| Sulfur | 1.25 |  | 0.50 |
| Morpholine disulfide |  | 1.50 | 1.0 |

The stocks so compounded were vulcanized in the usual manner by heating in a press at the temperature of 52 pounds steam pressure per square inch. The modulus and tensile properties of the cured rubber products are given below:

Table V

| Stock | Cure time in mins. | Modulus of elasticity in lbs./in.² at elongations of— | | Tensile at break in lbs./in.² | Ult. elong. |
|---|---|---|---|---|---|
| | | 500% | 700% | | |
| | | | | | Percent |
| K | 12 | 1,475 | 3,700 | 4,160 | 750 |
| L | 12 | 1,090 | 2,770 | 3,740 | 790 |
| M | 12 | 1,690 | 4,050 | 4,500 | 740 |

The above data show that the incorporation of one of the preferred materials as a vulcanizing agent in an amount containing about 0.40 part of sulfur while giving a good cure in 12 minutes provides, as might be expected, a rubber stock somewhat weaker than a similar stock containing 1.25 parts by weight of sulfur. However replacing 0.5 part of sulfur has the surprising result of providing a vulcanizate possessing physical properties markedly superior to those of the sulfur stock. As the following table shows, the scorch has likewise been markedly retarded.

Plasticity data

| Preheating time in mins. | Temp., °F. | Stock | Plasticity figure |
|---|---|---|---|
| 240 | 200 | K | 570 |
| 330 | 200 | L | 320 |
| 420 | 200 | M | 502 |

A further surprising effect was found after artificially aging the above described stocks by heating in a bomb for 15 and 18 hours at 260° F. and under 80 pounds air pressure per square inch. The aged rubber product obtained from the M stock, that is from the stock containing morpholine disulfide in conjunction with a small amount of sulfur, exhibited higher modulus and tensile properties than did either the K or L stock after aging.

As further specific embodiments of the invention rubber stocks were compounded comprising

| | Stock | | | |
|---|---|---|---|---|
| | N | O | P | R |
| | Parts by weight | Parts by weight | Parts by weight | Parts by weight |
| Smoked sheets of rubber | 100 | 100 | 100 | 100 |
| Whiting | 40 | 40 | 40 | 40 |
| Zinc oxide | 5 | 5 | 5 | 5 |
| Stearic acid | 1 | 1 | 1 | 1 |
| Mineral acid treated 2,2,4-trimethyl dihydroquinoline | 2 | 2 | 2 | 2 |
| Di(benzothiazyl thiol) dimethyl urea | 1.05 | 1.05 | 1.05 | 1.05 |
| Diphenyl guanidine phthalate | 0.45 | 0.45 | 0.45 | 0.45 |
| Sulfur | 1.25 | 1.00 | 0.75 | 0.50 |
| Morpholine tetrasulfide | | 0.25 | 0.50 | 0.75 |

The stocks so compounded were vulcanized in the usual manner by heating in a press at the temperature of 52 pounds steam pressure per square inch. The modulus and tensile properties of the cured rubber products are given below:

Table VI

| Stock | Cure time in mins. | Modulus of elasticity in lbs./in.² at elongations of— | | Tensile at break in lbs./in.² | Ult. elong. |
|---|---|---|---|---|---|
| | | 300% | 500% | | |
| | | | | | Percent |
| N | 12 | 410 | 1,240 | 3,360 | 700 |
| O | 12 | 410 | 1,260 | 3,270 | 685 |
| P | 12 | 400 | 1,250 | 3,410 | 700 |
| R | 12 | 420 | 1,330 | 3,250 | 670 |

The above data show the desirable physical properties of vulcanizates obtained from rubber stocks wherein varying proportions of sulfur are replaced by one of the preferred class of materials.

Plasticity data

| Preheating | | Stock | Plasticity figure |
|---|---|---|---|
| Time in mins. | Temp., °F. | | |
| 240 | 200 | N | 372 |
| 240 | 200 | O | 304 |
| 300 | 200 | P | 408 |
| 300 | 200 | R | 340 |

The plasticity data show that the scorch of uncured rubber stocks is reduced or retarded by replacing a portion of the sulfur normally used as vulcanizing agent by one of the preferred class of materials.

The morpholine sulfides possess appreciable accelerating properties and may be so used in conjunction with the usual amounts of sulfur. For example a rubber stock comprising pale crepe rubber 100, zinc oxide 10, sulfur 3, stearic acid 0.5 and morpholine disulfide 1.87 parts by weight, gave a good cure in sixty minutes when vulcanized in a press at the temperature of thirty pounds of steam pressure per square inch. In the ninety minute cure this stock showed a higher modulus and tensile strength than a similar stock accelerated with 1.0 part by weight of mercaptobenzothiazole. However, when advantage is taken of their accelerating properties morpholine sulfides are preferably employed in conjunction with an accelerator of a different class. For example non scorching stocks possessing good modulus and tensile characteristics as well as desirable aging resistance have been obtained by use of tetramethyl thiuram monosulfide or disulfide in conjunction with a morpholine sulfide. In addition to the thiuram sulfides dithiocarbamates and aldehyde-amines such as sodium dimethyl dithiocarbamate, zinc dibutyl dithiocarbamate, butylaldehyde-aniline, acetaldehyde-aniline and formaldehyde-aniline may be used with advantage. Particularly with thiazole accelerators do the preferred class of materials show desirable activating properties. Typical examples of thiazole accelerators comprise mercaptobenzothiazole, mercapto phenyl benzothiazole, mercapto naphtho thiazole, dinitro phenyl benzothiazyl sulfide, benzothiazyl thio benzoate, dibenzothiazyl disulfide and the piperidine and cyclohexylamine salts of mercaptobenzothiazole.

As specific embodiments of the invention illustrating the use of thiazole accelerators in conjunction with small amounts of the preferred class of material rubber stocks were compounded comprising

| | Stock | | | | | |
|---|---|---|---|---|---|---|
| | S | T | U | V | W | X |
| | Parts by weight | Parts by weight | Parts by weight | Parts by weight | Parts by weight | Parts by weight |
| Smoked sheets of rubber | 100 | 100 | 100 | 100 | 100 | 100 |
| Zinc oxide | 10 | 10 | 10 | 10 | 10 | 10 |
| Sulfur | 3 | 3 | 3 | 3 | 3 | 3 |
| Stearic acid | 0.5 | 0.5 | 0.5 | 0.5 | 0.5 | 0.5 |
| Mercaptobenzothiazole | 0.5 | 0.5 | | | | |
| Di(benzothiazyl thiol) dimethyl urea | | | 0.5 | 0.5 | | |
| Cyclohexylamino thio benzothiazole | | | | | 0.5 | 0.5 |
| Morpholine disulfide | 0.10 | 0.15 | 0.10 | 0.15 | 0.10 | 0.15 |

The stocks so compounded were vulcanized in the usual manner by heating for different periods of time in a press at the temperature of twenty pounds of steam pressure per square inch. The modulus and tensile properties of the cured rubber products appear below:

*Table VII*

| Stock | Cure time in mins. | Modulus of elasticity in lbs./in.² at elongations of— | | Tensile at break in lbs./in.² | Ult. elong. |
|---|---|---|---|---|---|
| | | 500% | 700% | | |
| | | | | | Per cent |
| S | 45 | 460 | 1,980 | 3,100 | 790 |
| T | 45 | 550 | 2,480 | 4,000 | 800 |
| S | 90 | 625 | 2,330 | 3,730 | 790 |
| T | 90 | 715 | 2,980 | 3,800 | 750 |
| U | 45 | 205 | 665 | 2,000 | 905 |
| V | 45 | 260 | 975 | 2,280 | 860 |
| U | 90 | 440 | 1,625 | 3,100 | 830 |
| V | 90 | 495 | 2,050 | 3,250 | 790 |
| W | 45 | 360 | 1,170 | 2,725 | 860 |
| X | 45 | 250 | 920 | 2,400 | 885 |
| W | 90 | 1,230 | 4,500 | 4,500 | 700 |
| X | 90 | 1,365 | 4,580 | 4,580 | 700 |

The above data show the desirable modulus and tensile properties obtained by use of the preferred class of materials as activators for thiazole accelerators. Still further improvements result from increasing the amounts of morpholine sulfide. For example it was found that by using 0.25 part by weight of morpholine disulfide in the stocks described above the modulus and tensile properties were correspondingly higher.

The foregoing examples are intended to be illustrative of the invention and not a limitation thereof. Other vulcanized products may be obtained by employing other compounding ingredients than those particularly set forth. The invention is limited solely by the following claims.

What is claimed is:

1. The process of vulcanizing rubber which comprises heating rubber in the presence of a dimorpholyl sulfide.

2. The process of vulcanizing rubber which comprises heating rubber and sulfur in such amount that danger of prevulcanization is substantially eliminated in the presence of a dimorpholyl sulfide.

3. The process of vulcanizing rubber which comprises heating rubber and sulfur in such amount that danger of prevulcanization is substantially eliminated, in the presence of a dimorpholyl sulfide containing at least two atoms of sulfur per molecule.

4. The process of vulcanizing rubber which comprises heating rubber and sulfur in such amount that danger of prevulcanization is substantially eliminated in the presence of a dimorpholyl sulfide and an accelerator other than a dimorpholyl sulfide.

5. The process of vulcanizing rubber which comprises heating rubber and sulfur in the presence of a dimorpholyl sulfide and an accelerator other than a dimorpholyl sulfide.

6. The process of vulcanizing rubber which comprises heating rubber in the presence of a dimorpholyl sulfide in such proportion as contains up to about one part of sulfur based on the rubber and an accelerator tending to cause prevulcanization of the rubber in the presence of sulfur.

7. The process of vulcanizing rubber which comprises heating rubber in the presence of a dimorpholyl sulfide containing at least two atoms of sulfur per molecule and sulfur in an amount such that danger of prevulcanization is substantially eliminated and an accelerator tending to cause prevulcanization of the rubber in the presence of sulfur.

8. The process of vulcanizing rubber which comprises heating rubber, an accelerator tending to cause prevulcanization of the rubber in the presence of sulfur and at least 0.05 part of sulfur in the presence of a dimorpholyl sulfide containing at least two atoms of sulfur per molecule in such proportion as contains up to about one part of sulfur based on the rubber the amount of sulfur being such that danger of prevulcanization is substantially eliminated.

9. The process of vulcanizing rubber which comprises heating rubber in the presence of morpholine disulfide.

10. The process of vulcanizing rubber which comprises heating rubber in the presence of a dimorpholyl polysulfide.

11. The vulcanized rubber product obtained by heating rubber in the presence of a dimorpholyl sulfide.

12. The vulcanized rubber product obtained by heating rubber and sulfur in such amount that danger of prevulcanization is substantially eliminated in the presence of a dimorpholyl sulfide.

13. The vulcanized rubber product obtained by heating rubber and sulfur in such amount that danger of prevulcanization is substantially eliminated, in the presence of a dimorpholyl sulfide containing at least two atoms of sulfur per molecule.

14. The vulcanized rubber product obtained by heating rubber and sulfur in such amount that danger of prevulcanization is substantially eliminated in the presence of a dimorpholyl sulfide and an accelerator other than a dimorpholyl sulfide.

15. The vulcanized rubber product obtained by heating rubber and sulfur in the presence of a dimorpholyl sulfide and an accelerator other than a dimorpholyl sulfide.

16. The vulcanized rubber product obtained by heating rubber in the presence of a dimorpholyl sulfide in such proportion as contains up to about one part of sulfur based on the rubber and an accelerator tending to cause prevulcanization of the rubber in the presence of sulfur.

17. The vulcanized rubber product obtained by heating rubber in the presence of a dimorpholyl sulfide containing at least two atoms of sulfur per molecule and sulfur in an amount such that danger of prevulcanization is substantially eliminated and an accelerator tending to cause prevulcanization of the rubber in the presence of sulfur.

18. The vulcanized rubber product obtained by heating rubber an accelerator tending to cause prevulcanization of the rubber in the presence of sulfur and at least 0.05 part of sulfur in the presence of a dimorpholyl sulfide containing at least two atoms of sulfur per molecule in such proportion as contains up to about one part of sulfur based on the rubber the amount of sulfur being such that danger of prevulcanization is substantially eliminated.

19. The vulcanized rubber product obtained by heating rubber in the presence of morpholine disulfide.

20. The vulcanized rubber product obtained by heating rubber in the presence of a dimorpholyl polysulfide.

EDWARD S. BLAKE.